US 12,385,539 B2

(12) United States Patent
Jedele

(10) Patent No.: US 12,385,539 B2
(45) Date of Patent: Aug. 12, 2025

(54) NUT TRAPPING TWO-PIECE PISTON

(71) Applicant: Akebono Brake Industry Co., Ltd., Tokyo (JP)

(72) Inventor: Philip Nathanael Jedele, Ypsilanti, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 445 days.

(21) Appl. No.: 17/959,059

(22) Filed: Oct. 3, 2022

(65) Prior Publication Data

US 2024/0110605 A1    Apr. 4, 2024

(51) Int. Cl.
| F16D 65/18 | (2006.01) |
| F16D 121/02 | (2012.01) |
| F16D 125/06 | (2012.01) |
| F16D 125/40 | (2012.01) |

(52) U.S. Cl.
CPC .......... *F16D 65/18* (2013.01); *F16D 2121/02* (2013.01); *F16D 2125/06* (2013.01); *F16D 2125/40* (2013.01)

(58) Field of Classification Search
CPC .. F16D 65/18; F16D 2121/02; F16D 2125/06; F16D 2125/40
USPC .............. 188/72.4, 72.6–72.9, 106 A, 106 P, 188/156–164, 196 D
See application file for complete search history.

(56) References Cited

U.S. PATENT DOCUMENTS

| 3,688,875 A | 9/1972 | De Hoff et al. |
| 3,732,952 A * | 5/1973 | Asquith ................ F16D 65/567 188/71.9 |
| 3,885,653 A * | 5/1975 | Farr ....................... F16D 65/567 188/71.9 |
| 4,375,250 A | 3/1983 | Burgdorf |
| 4,804,073 A | 2/1989 | Taig et al. |
| 5,355,774 A | 10/1994 | Ditlinger |
| 8,561,762 B2 | 10/2013 | Sckupska et al. |
| 9,151,385 B2 | 10/2015 | Winkler et al. |
| 9,347,507 B2 | 5/2016 | Choe et al. |
| 9,387,837 B2 | 7/2016 | Yokoyama |
| 9,441,690 B2 | 9/2016 | Burgoon |
| 9,593,728 B2 * | 3/2017 | DeMorais ............. F16D 65/183 |
| 9,850,971 B1 | 12/2017 | Demorais et al. |
| 9,964,165 B2 * | 5/2018 | Chelaidite ............... B60T 11/04 |
| 10,267,369 B2 | 4/2019 | Lethorn et al. |

(Continued)

FOREIGN PATENT DOCUMENTS

| CN | 102965321 A | 3/2013 |
| CN | 102518710 B * | 4/2014 ........... F16D 55/224 |

(Continued)

OTHER PUBLICATIONS

International Search Report and Written Opinion, PCT Application No. PCT/IB2023/000569 dated Feb. 6, 2024.

*Primary Examiner* — Christopher P Schwartz

(74) *Attorney, Agent, or Firm* — The Dobrusin Law Firm, P.C.

(57) ABSTRACT

A brake system comprising: (a) a caliper housing connected to or formed with a piston housing; (b) a piston having a piston face seated in a piston main, wherein the piston is at least partially secured within the piston housing; and (c) a ball and nut assembly (BNA) adapted to move the piston face relative to the piston main to engage a brake pad of the brake system.

19 Claims, 5 Drawing Sheets

(56) References Cited

U.S. PATENT DOCUMENTS

| | | |
|---|---|---|
| 11,149,807 B2 | 10/2021 | Haines et al. |
| 11,835,102 B2 * | 12/2023 | Smith ................... F16D 65/18 |
| 11,953,065 B2 * | 4/2024 | Jenkins ............... F16D 65/0006 |
| 2007/0062769 A1 | 3/2007 | Noh |
| 2009/0133973 A1 | 5/2009 | Shibata |
| 2010/0187049 A1 | 7/2010 | Erben et al. |
| 2017/0082157 A1 | 3/2017 | Son et al. |
| 2017/0261053 A1 | 9/2017 | Schaefer et al. |
| 2022/0163076 A1 | 5/2022 | Fawcett et al. |
| 2023/0140201 A1 * | 5/2023 | Zenzen ................ F16D 65/183 188/72.6 |
| 2024/0389279 A1 * | 11/2024 | Uchida ................... H02K 5/22 |

FOREIGN PATENT DOCUMENTS

| | | |
|---|---|---|
| DE | 102009060155 A1 | 11/2010 |
| FR | 3038951 B1 | 7/2017 |

* cited by examiner

NUT TRAPPING TWO-PIECE PISTON

FIELD

The present teachings generally relate to a brake system, and more particularly, to a nut trapping two-piece piston of an electric park brake system.

BACKGROUND

Parking brake systems are used in a variety of vehicles to prevent movement of a stopped or parked vehicle. In disc brake systems, the parking brake system may move a pair of opposing brake pads into engagement with a brake rotor to create a parking brake force. Similarly, in drum-in-hat brake systems, the brake system may move a pair of brake shoes radially outward against the drum portion of a brake rotor to create a parking brake force.

In some applications, parking brake systems are electro-mechanical systems that may include a motor and an actuator assembly for moving the brake pads or the brake shoes against the brake rotor or the drum portion of a brake rotor, respectively, to create the parking brake force. Such parking brake systems may include a rotary to linear (RTL) actuator, such as a spindle and nut assembly, to drive a brake piston into the brake pad, thereby creating a clamping force on the rotor. Additionally, such brake systems—including the parking brake system—may also utilize a two-piece piston structure to aid with overheating, excessive pressure building within the system, or a combination thereof. These types of electromechanical parking brake systems may frequently be incorporated into a brake system that utilizes hydraulic pressure for a standard brake apply. As a result, it is often desired to seal at least a portion of the spindle and nut assembly from the hydraulic fluid to ensure proper articulation of both the park brake system and the hydraulically applied brake system.

However, due to the additional sealing requirements for the spindle and nut assembly and the piston, travel capabilities of the spindle and nut assembly may be hindered, thereby significantly decreasing the overall travel length of the spindle and nut assembly. As a result, the piston may then be unable to travel the needed distance to engage the brake pad and successfully complete a park apply operation. Similarly, in certain circumstances, the piston may over travel relative to the spindle and nut assembly, whereby the spindle and nut assembly is unable to maintain engagement with the piston and thus disengage altogether from the piston. Additionally, the shortened travel length required due to the additional sealing of the spindle and nut assembly may also hinder the anti-rotation engagement between the spindle and nut assembly and the piston that may be required to ensure proper operation of the park brake system.

Examples of brake systems can be found in U.S. Pat. Nos. 4,375,250; 8,561,762; and 10,267,369; and U.S. Patent Publication No. 2022/0163076, all of which are incorporated herein in their entirety for all purposes. Based on the above, it would be attractive to have a parking brake system that may be incorporated into a brake system having a two-piece piston. What is needed it a parking brake system that utilizes a spindle and nut assembly which engages a piston face of the two-piece piston. Additionally, it would be attractive to have a parking brake system that includes a spindle and nut assembly that is sealed from hydraulic fluid within the brake system without compromising a travel distance of the spindle and nut assembly. What is needed is a parking brake system that includes a spindle and nut assembly having an anti-rotation feature that maintains engagement to the brake piston. Moreover, it would be attractive to have a parking brake system that may be easily incorporated into a brake system. Therefore, what is needed is a park brake system that may be in communication with the piston free of press-fit or threaded components.

SUMMARY

The present teachings meet one or more of the present needs by providing a brake system comprising: (a) a caliper housing connected to or formed with a piston housing; (b) a piston having a piston face seated in a piston main, wherein the piston is at least partially secured within the piston housing; and (c) a spindle and nut assembly adapted to move the piston face relative to the piston main to engage a brake pad of the brake system.

The spindle and nut assembly may include a nut threadably engaged to a spindle so that rotational movement of the spindle may be translated into linear movement of the nut. Additionally, a contact surface of the nut may contact an interior surface of the piston face to move the piston face. Moreover, the nut may include an anti-rotation feature that engages an anti-rotation feature of the piston face. The anti-rotation feature of the piston face may be located within a cavity of the piston face, and the anti-rotation feature of the nut may be inserted into the cavity to engage the anti-rotation feature of the piston face. The anti-rotation feature of the piston face may be a substantially flat portion along an annular surface of the cavity. Similarly, the anti-rotation feature of the nut may be is a substantially flat portion located along the nut. The nut may also include an internal threading that engages an external threading of the spindle. The internal threading may extend along only a portion of a length of the nut.

The piston main may include a channel having a first opening and an opposing second opening. A diameter of the first opening may be less than a diameter of the second opening. The nut and the piston face may be inserted through the opposing second opening, and the nut may extend at least partially through the first opening after insertion. Moreover, the nut may include a flange having a diameter greater than a diameter of the first opening.

The BNA may move the piston face to engage the brake pad during a parking brake apply operation. Moreover, during a brake apply operation, the piston main may be moved by hydraulic fluid located within the piston housing between the piston housing and the piston main, whereby the piston main may move the piston face so that the piston face engages the brake pad. The spindle and nut assembly may remain stationary during the brake apply operation. Similarly, the piston main may remain stationary when the spindle and nut assembly moves the piston face.

A seal may be located between the piston main and the spindle and nut assembly to prevent leaking of the hydraulic fluid. A second seal may be located between the piston main and the piston housing to prevent leaking of the hydraulic fluid. The hydraulic fluid may also be free of contact with the piston main.

The present teachings may also meet one or more of the present needs by providing: a parking brake system that may be incorporated into a brake system having a two-piece piston; a parking brake system that utilizes a spindle and nut assembly which engages a piston face of the two-piece piston; a parking brake system that includes a spindle and nut assembly that is sealed from hydraulic fluid within the brake system without compromising a travel distance of the spindle and nut assembly; a parking brake system that includes a spindle and nut assembly having an anti-rotation feature that maintains engagement to the brake piston; a parking brake system that may be easily incorporated into a brake system; a park brake system that may be in communication with the piston free of press-fit or threaded components.

DETAILED DESCRIPTION

Figure 1:
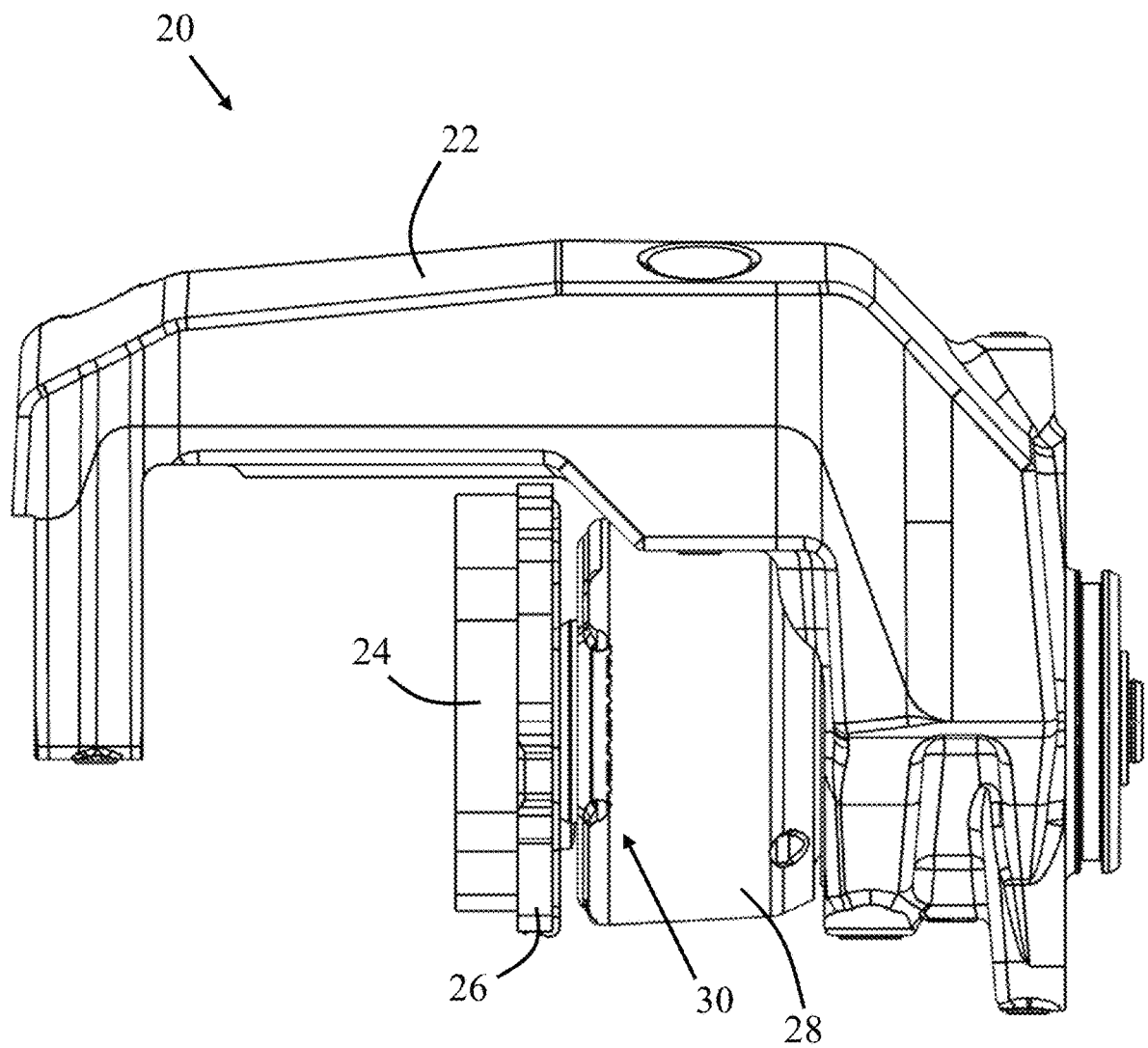
FIG. 1 is perspective view of a brake system in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a brake system. The brake system may be adapted for use in a vehicle, such as a passenger vehicle, commercial vehicle, or both. However, it is envisioned that the brake system as described herein may not be limited to passenger and/or commercial vehicles, but rather may also be incorporated into other vehicles, such a train, airplane, bus, or a combination thereof.

The brake system may function to decelerate a vehicle. The brake system may also be configured to maintain a vehicle position when stationary (i.e., parked). The brake system may include one or more stationary components, one or more dynamic components, or both. The brake system may utilize one or more brake pads or brake shoes to engage a rotor or disc of a vehicle wheel. The brake pads or brake shoes may apply a clamping load to the moving rotor or disc to decelerate and eventually stop the vehicle (i.e., a brake apply operation). Similarly, the brake pads or brake shoes may apply a continuous load to the rotor or disc when the vehicle is stationary to maintain a position of the vehicle (i.e., a parking brake apply operation).

The brake system may have any desired configuration. It is envisioned that the teachings here may related to any number of brake systems. The brake system may include one or more brake calipers, one or more pistons, or both. The brake system may include a fixed opposed brake caliper, a floating caliper, or both. The brake system may include a single piston, twin pistons, more than two pistons, or a combination thereof. The brake system may be an electrical brake system with a hydraulic load application or a fully electromechanical brake system free of a hydraulic load application. The brake system may include both a hydraulic load application and a fully electromechanical braking load application based on certain circumstances. For example, the brake system may apply a hydraulic load during a brake apply operation when the vehicle is moving yet apply a fully electromechanical braking load free of a hydraulic load during a parking brake apply operation. However, in certain situations, a hydraulic load may be used in conjunction with a fully electromechanical brake load.

As stated above, the brake system may include one or more brake pads or brake shoes. The brake pads or brake shoes may function to contact a rotor of a vehicle to stop movement of the rotor. The brake pads or brake shoes may be moved directly by the brake system. That is, a dynamic component of the brake system, such as a piston, may contact the brake pad or brake shoe directly to move the brake pad into contact with the rotor. Similarly, the brake system may also indirectly move the brake pad or brake shoe by contacting an intermediate component, such as a pressure plate secured or otherwise connected to the brake pad. In either case, the brake system may create a clamping or frictional force on the rotor using the brake pads or brake shoes.

The brake system may include a piston. The piston may function to drive the brake pads or brake shoes of the brake system towards the rotor or disc of a vehicle wheel. The piston may apply a load on the brake pads or brake shoes to decelerate the rotor or disc of the vehicle wheel. Similarly, the piston may maintain an applied load on the brake pads or brake shoes to maintain a position of the rotor or disc of the vehicle wheel, thereby maintaining a position of the vehicle itself (i.e., the vehicle when parked). Moreover, as stated above, the piston may be electromechanically driven with or without a hydraulic load application. That is, the piston may be drive fully or partially by a hydraulic load, fully or partially by an electromechanical load, or a combination thereof. Such application of load may drive the piston in a direction substantially parallel to an axis of rotation of the rotor or the disc, axially along the axis of rotation of the rotor, or both.

Any desired size and/or shape piston may be utilized. The piston may be a single or one-piece piston (i.e., a monolithically formed piston), may be a two-piece piston, or may be a multi-piece piston having greater than two pieces. However, the present teachings envision a two-piece piston providing additional benefits when compared to a conventional one-piece piston. That is, a two-piece piston as taught herein may advantageously disperse excessive heat and/or pressure within the brake system during operation to avoid failure of the brake system. Such heat and/or pressure may be caused by the hydraulic fluid located within a piston housing of the brake system, may be caused by the operation of the brake system, or both. As a result, a two-piece piston may include components that move relative to each to accommodate for such fluctuations in temperature and/or pressure. Similarly, the two-piece piston may also include venting (e.g., vent holes, slots gaps, etc.) to allow for release of such pressure and/or heat.

The piston may be at least partially positioned within a piston housing. The piston housing may function to at least partially contain and/or protect the piston. The piston housing may be formed with the caliper housing of the brake system, such as a caliper bore, caliper cavity, caliper channel, etc. However, the piston housing may also be a secondary housing that is attached or otherwise secure to or within the caliper housing. While any size or geometry may be used for the piston housing, it is envisioned that the piston housing may be shaped similar to at least a portion of the piston to allow for proper sealing of the piston within the piston housing. For example, the piston may be seated within the piston housing so that a gap between the piston and the piston housing may be sealed to prevent leakage of the hydraulic fluid located within the piston housing.

The piston housing may be located anywhere along the caliper housing. The piston housing may be located adjacent to a position of the brake pad so that movement of the piston contacts the brake pad. Similarly, the piston housing may be positioned within the caliper housing so that movement of the piston is parallel to, or coaxial with, the axis of rotation of the vehicle rotor or disc. However, such mounting of the piston housing in the desired location is not limited to any specific mounting features. But rather, mounting or incorporation of the piston housing within the caliper housing may be completed using one or more fasteners, one or more adhesives, integral forming of the piston housing with the caliper housing, or a combination thereof.

The piston may include a piston face. The piston face may be one piece of the two-piece piston structure. The piston face may function to move and contact the brake pad or an intermediate piece of a brake pad assembly (e.g., a pressure plate), thereby driving the brake pad towards the rotor of the vehicle. The piston face may be drive electromechanically or by a hydraulic load. The piston face may move relative to addition pieces of the piston, such as a piston main as described herein. For example, when the piston face is moved electromechanically, such as during a parking brake apply operation, the piston may move away from the piston main and towards the brake pad. Conversely, when the piston face is moved by a hydraulic load, the piston main may move towards the piston face, thereby moving the piston face towards the brake pad.

The piston face may be at least partially located within the piston housing. The piston face may extend out of the piston housing to contact the brake pad. The piston face may be in communication with an electromechanical component that drives the piston face, such as a rotary to linear actuator (e.g., a ball and nut assembly). The piston face may also be in communication with other pieces of the piston that may facilitate movement of the piston face by a hydraulic load. Thus, the piston face may be drive both by a hydraulic load and an electromechanical load.

The piston face may include a contact surface. The contact surface may function to contact the brake pad or brake pad assembly (e.g., a pressure plate) to drive the brake pad into the rotor or disc of the vehicle. The contact surface may be an exterior surface of the piston face. The contact surface may be integrally (i.e., monolithically) formed with the piston face. The contact surface may be abrasive, smooth, have a friction modifier applied thereto, or a combination thereof. The contact surface may be planar, may contain one or more undulations, may be arcuate, or a combination thereof. The contact surface may include one or more grooves, one or more cutouts, one or more channels, one or more holes, one or more cavities, or a combination thereof. The grooves, cutouts, channels, holes, cavities, or a combination thereof may be located along an interior portion of the contact surface away from a perimeter of the contact surface, may be located along the perimeter of the contact surface, or both. Similarly, such features may also have any desired size and/or shape. Moreover, a contour of the contact surface may correspond with a surface of the brake pad or brake pad assembly upon which it contacts. However, the contact surface may also have a dissimilar surface contour to the surface of the brake pad or brake pad assembly upon which it contacts. The contact surface may be a surface most inboard towards the brake vehicle rotor or disc.

The contact surface may be located along a flange of the piston face. The flange may extend radially outward from a portion of the piston face such that a diameter of the flange is greater than a diameter of the remaining portion of the piston face. The flange may function to increase a surface space of the contact surface. The flange may function to contact one or more components of the brake system, such as the brake pad or brake assembly, the piston housing, the piston main, one or more additional components, or a combination thereof. The flange may abut an outer surface of the piston main in certain circumstances. However, the flange may also be free of contact with both the piston main and the brake pad or brake pad assembly. The flange of the piston face may include one or more grooves, one or more channels, or a combination thereof. The flange may also be at least partially formed from one or more grooves, cutouts, or channels along the contact space to accommodate contours or features along the brake pad or brake pad assembly to ensure a sufficiently square or flush contact between the contact surface and the brake pad or brake pad assembly.

The flange may extend from or be adjacent to a neck of the piston face. The neck may function as a portion of the piston face that extends into the piston housing to engage the piston housing, engage another portion of the piston (e.g., the piston main) located within the piston housing, or both. The neck may form a body of the piston face. The neck may be generally annular along an outer surface. The neck may vary in length as measured along a longitudinal axis of the piston face (e.g., an axis parallel to or coaxial with the axis of rotation of the rotor or disc of the vehicle). The neck may be fully positioned within the piston housing or may at least partially protrude from the piston housing. The neck may be in communication with the piston main. That is, the neck may contact and/or slide along a surface of the piston main to guide a direction of the piston face during operation.

The neck of the piston face may include a cavity. The cavity may function to receive a portion of the rotary to linear actuator, such as a spindle and nut assembly. The cavity may extend along a portion or an entire length of the neck. The cavity may extend into the flange. The cavity may include one or more openings that receive the spindle and nut assembly. The cavity may include an interior surface that forms a shape of the cavity. The interior surface may be similar to or dissimilar from an outer surface of the neck. For example, the interior surface may be substantially square or rectangular while an outer surface of the neck may be generally annular. Moreover, as a result of the cavity, a wall thickness as measured between the exterior and interior surfaces along the neck may be uniform or may vary.

The cavity may include one or more anti-rotation features. The anti-rotation features may function to engage the spindle and nut assembly and prevent rotation of the piston face and the spindle and nut assembly relative to each other. The anti-rotation features may engage any portion of the spindle and nut assembly, such as an outer surface of the spindle and nut assembly received within the cavity of the piston face. The anti-rotation features may be a projection, cutout, notch, fillet, contoured portion, linear segment, bump, undulation, arcuate portion, concave portion, convex portion, or a combination thereof. The anti-rotation features may be formed along the interior surface of the cavity. However, the anti-rotation features may also be connected to the interior surface. The anti-rotation features may be a flat segment along the interior surface of the cavity to contact an exterior surface of the spindle and nut assembly and prevent rotation of the spindle and nut assembly relative to the piston face, prevent rotation of the piston face relative to the spindle and nut assembly, or both. Advantageously, the anti-rotation features of the piston face may prevent rotation of the piston face and the spindle and nut assembly relative to each other while still allowing for the piston face and/or the spindle and nut assembly to move in a linear direction towards and/or away from the brake pad. Similarly, the anti-rotation features of the piston face may prevent rotation of a portion of the spindle and nut assembly, such as a nut thereof, while still allowing for rotation of additional components with the spindle and nut assembly, such as a spindle.

It should be noted that any number of anti-rotation features may be present within the cavity or other locations along the piston face. The piston face may include one or more, two or more, or three or more anti-rotation features. The piston face may include ten or less, eight or less, or six or less anti-rotation features.

The piston may also include a piston main. The piston main may function to drive the piston face towards the brake pad or brake pad assembly. In particular, it is envisioned that the piston main may be exposed to a hydraulic load that moves the piston main towards the brake pad or brake pad assembly. As a result, the piston main may be in communication with the piston face, thereby moving the piston face towards the brake pad or brake pad assembly to contact and drive the brake pad or brake pad assembly. Such hydraulic operation may be completed during a brake apply operation. Conversely, the piston main may remain substantially stationary during a parking brake apply operation or allow for movement of the piston face away from the piston main during the parking brake apply operation. However, the piston main may also facilitate movement of the piston main due to a hydraulic load or an electromechanical load. For example, the piston main may be directly movement by the hydraulic load or may be indirectly moved by a spindle and nut assembly that contacts and directly moves the piston face. Such movement of the piston face may result in movement of the piston main due to a friction fit or other type of engagement and/or connection between the piston main and the piston face. Thus, it may be gleaned from the present teachings that the piston main and the piston face may advantageously move simultaneously and/or separately depending on the type of operation being completed by the brake system.

The piston main may be located partially or entirely within the piston housing. The piston main may directly contact a hydraulic fluid located within the piston housing. However, the piston main may include one or more seals, one or more O-rings, or a combination thereof that prevents the hydraulic fluid from entering the piston face, the spindle and nut assembly, or both. As such, the piston may interact with the piston housing to advantageously allow for both hydraulic load application and electromechanical load application to the piston without deterioration or failure of the brake system caused by the hydraulic fluid.

The piston main may include a base surface. The base surface may function to abut a surface of the piston housing or a cavity therein. The base surface may be an exterior outboard surface of the piston main. The base surface may include one or more grooves, one or more undulations, one or more bumps, one or more cutouts, or a combination thereof. The base surface may include an opening into an interior channel of the piston main.

The channel of the piston main may function to receive a portion of the piston face. For example, the channel of the piston main may receive the neck of the piston face. The channel of the piston main may have an interior surface that abuts or mates with an exterior surface of the piston face to allow for movement of the piston face relative to the piston main. The channel of the piston main may include one or more anti-rotation features that engage the piston face and prevent rotation of the piston face and the piston main relative to each other.

The piston main may also include an inboard surface. The inboard surface may abut a portion of the piston face or may be located proximate to the piston face. The inboard surface may provide a support surface for the piston face or may be free of contact with the piston face. The inboard surface may include an opening for the channel of the piston main. The opening may receive the piston face, a portion of the spindle and nut assembly, or both. The opening may be any size and/or shape.

As stated above, the piston face may be in communication with a spindle and nut assembly. The spindle and nut assembly may function to translate a rotational movement into a linear movement to axially drive the piston towards and/or away from the brake pads or brake shoes. The spindle and nut assembly may include one or more components that move axially, one or more components that rotate about an axis yet remain axially stationary, or both. The spindle and nut assembly may include one or more stages to convert the rotational movement into a linear movement. The spindle and nut assembly may include one or more mechanical components, one or more electrical components, or both.

The spindle and nut assembly may be positioned anywhere near the piston to drive the piston. The BNA may contact one or more pieces of the piston. For example, the spindle and nut assembly may contact the piston face, a piston main, or both. However, the spindle and nut assembly may also be free of contact with one or more pieces of the piston, such as the piston main. The spindle and nut assembly may be positioned adjacent to the piston or piston face such that a dynamic component of the spindle and nut assembly may contact and drive the piston. It is envisioned that at least a portion of the spindle and nut assembly may be positioned within the cavity of the piston face. The, the spindle and nut assembly may be at least partially protected by the piston face and may drive the piston face by contacting an inner wall of the piston face located within the cavity of the piston face. The spindle and nut assembly may also retract the piston during a release operation in certain circumstances so that the piston disengages the brake pads or brake shoes, thereby allowing for the brake pads or brake shoes to disengage the rotor or disc of the vehicle.

The spindle and nut assembly may be actuator based upon a rotational force applied to a spindle. The spindle may function to receive an external force to initiate movement (i.e., rotation) of the spindle. Such an external force may be applied by a motor and/or motor gear unit (MGU) in communication with the spindle. Communication between the motor and the spindle may done within or along an engaging portion of the spindle located proximate to the motor or MGU, thereby facilitation rotation of the spindle by the motor or MGU. Such rotation of the spindle may then translate into a linear movement of one or more additional components of the spindle and nut assembly, such as a nut.

The spindle may extend out of the piston housing and/or the caliper housing to communicate with the MGU and/or motor. The spindle may be supported by one or more bearings, one or more O-rings, one or more seals, one or more bushings, or a combination thereof. Such features may allow for proper rotation of the spindle while maintaining a position of the spindle within the piston housing and/or caliper housing. Moreover, the seals and/or O-rings may also advantageously prevent unwanted debris, fluid, or moisture from entering the inner workings of the spindle and nut assembly.

The spindle may communicate with one or more nuts to axially move the one or more nuts. The spindle may axially drive the piston during a parking brake apply operation or release thereof. However, the spindle may also at least partially drive the piston during a brake apply operation as well.

The spindle may vary in length, shape, diameter, or a combination thereof depending on the type of caliper housing and piston of the brake system. The spindle may include one or more steps. For example, the spindle may include a tapered portion having a diameter less than a diameter of a remaining segment of the spindle. Therefore, the spindle may beneficially engage or communicate with different components along different segments of the spindle. For example, a segment of the spindle having a larger diameter may engage a first nut and a second segment of the spindle having a smaller diameter may engage a second nut.

The spindle may communicate with one or more nuts via threading located along the spindle. The threading may be located along an external portion of the spindle. However, the spindle may also include internal threading within a channel or cavity in certain applications. The threading may have one or more sections of different threading types, spacing, or both. The threading may be uniform along a length of the spindle. The threading may mate with or mesh with threading of additional components, such as a nut. The threading may receive one or more balls of the BNA located between the spindle and one or more components, such as a nut of the BNA. The threading may have self-locking threads. As a result, the spindle may communicate with additional components, such as a nut, to either prevent backdrive or more efficiently drive the one or more components having threading free of self-locking threads.

The threading of the spindle may directly or indirectly communicate with additional components of the BNA. For example, the threading of the spindle may directly engage threading of a nut of the BNA to axially move the nut. Conversely, or alternatively, the threading of the spindle may indirectly engage threading of additional components, such as the nut, via a bearing ring, ball bearing, or both positioned between the spindle and the nut.

The spindle may linearly drive a nut of the BNA. The nut may function to drive the piston face towards the brake pad or brake pad assembly. The nut may move linearly based upon rotation of the spindle. Therefore, the nut may move along an axis of the spindle during operation to contact the piston face. The nut may be positioned at least partially around the spindle to engage the spindle. That is, the nut may have a channel with threading that engages threading of the spindle to move the nut along an axis of the spindle to contact the piston face. The channel may extend through an entire length of the nut, may include one or more openings, may include one or more closed ends, or a combination thereof. Moreover, the threading of the nut may be internal, external, or both. The threading may also be located along an entire length of the channel or a portion of the channel to dictate a travel length of the nut relative to the spindle.

The nut may have a body that partially or fully extends around the spindle. The body may be substantially annular. The nut may be positioned at least partially within the piston, such as within the cavity of the piston face, within the piston main, or both. The nut may extend through an opening or the piston face, the piston main, or both.

The nut may include a contact surface. The contact surface may function to contact the piston face to drive the piston face towards the brake pad or brake pad assembly. The contact surface of the nut may contact an inner surface or region of the piston face located within the cavity of the piston face. The contact surface of the nut may be an inboard-most surface of the nut located proximate to the piston face or brake pad. The contact surface may be integrally (i.e., monolithically) formed with the nut. The contact surface may be abrasive, smooth, have a friction modifier applied thereto, or a combination thereof. The contact surface may be planar, may contain one or more undulations, may be arcuate, or a combination thereof. The contact surface may include one or more grooves, one or more cutouts, one or more channels, one or more holes, one or more cavities, or a combination thereof. The grooves, cutouts, channels, holes, cavities, or a combination thereof may be located along an interior portion of the contact surface away from a perimeter of the contact surface, may be located along the perimeter of the contact surface, or both. Similarly, such features may also have any desired size and/or shape. Moreover, a contour of the contact surface may correspond with a surface of the piston face upon which it contacts. However, the contact surface of the nut may also have a dissimilar surface contour compared to a surface of the piston face upon which it contacts.

The contact surface of the nut may be located along a flange of the nut. The flange may extend radially outward from a portion of the nut such that a diameter of the flange is greater than a diameter of the nut. The flange may function to increase a surface space of the contact surface of the nut. The flange may function to contact one or more components of the piston, such as the piston face and/or the piston main. For example, the flange of the nut may have a diameter greater than a diameter of an opening of the piston main so that the flange prevents removal of the nut through the opening of the piston main. Additionally, the flange along a peripheral edge may contact the interior surface of the piston face to maintain movement of the nut relative to the piston face.

The flange of the nut may include one or more anti-rotation features. The anti-rotation features of the nut may function to engage the anti-rotation features of the piston face located within a cavity of the piston face, thereby preventing rotation of the piston face and the nut relative to each other. As a result, the nut may be free of rotation when the spindle is rotated, thereby facilitating linear movement of the nut towards and/or away from the piston face to allow contact between the nut and the piston face. However, the anti-rotation features of the nut may also engage one or more portions of the piston main.

The anti-rotation features of the nut may be a projection, cutout, notch, fillet, contoured portion, linear segment, bump, undulation, arcuate portion, concave portion, convex portion, or a combination thereof. The anti-rotation features may be formed along an exterior surface of the nut, such as along the flange of the nut. However, the anti-rotation features of the nut may be located anywhere along the nut. The anti-rotation features may be a flat segment located along a generally annular exterior surface or perimeter of the flange of the nut that contacts an interior surface of the cavity of the piston face.

It should be noted that any number of anti-rotation features may be present along the nut. The nut may include the same number or a different number of anti-rotation features when compared to the anti-rotation features of the piston face. The nut may include one or more, two or more, or three or more anti-rotation features. The nut may include ten or less, eight or less, or six or less anti-rotation features.

Additionally, as mentioned above, the brake system may include hydraulic fluid therein to apply a hydraulic load to the piston during a brake apply operation. As a result, to ensure proper operation of the brake system, the hydraulic fluid may be contained within a cavity of the piston housing such that the hydraulic fluid contacts the piston without leaking into unwanted cavities or components of the brake system. That is, it may be particularly advantageous or necessary to prevent hydraulic fluid from entering components of a park brake apply operation, such as the spindle and nut assembly, the cavity of the piston face, or both. Similarly, it may be desired to prevent leaking of the hydraulic fluid out of the piston housing, thereby rendering operation of piston inoperable in certain situations, such as a brake apply operation.

To combat the above issues, the brake system may include one or more seals, one or more O-rings, one or more washers, or a combination thereof located between components of the brake system to contain the hydraulic fluid in the desired location within the piston housing. That is, the seals, O-rings, washers, or a combination thereof may be located between the piston main and the piston face, the piston main and the piston housing, the piston face and the piston, or a combination thereof. Similarly, the seals, O-rings, washers, or a combination thereof may be located between the spindle and nut assembly (e.g., the nut of the spindle and nut assembly, the spindle or the spindle and nut assembly, or both) and the piston housing, the piston main, the piston face, or a combination thereof. Such seals, O-rings, washers, or a combination thereof may be located within grooves or cutouts along any of the aforementioned components (piston, piston housing, spindle and nut assembly) to maintain a location of the seals, O-rings, washers, or a combination thereof. However, it is envisioned that the seals, O-rings, washers, or a combination thereof may compressibly seal any unwanted gaps between the piston, piston housing, and the spindle and nut assembly without preventing movement of the piston of spindle and nut assembly during a brake apply or parking brake apply operation. Therefore, the present teachings are not limited to any specific number of seals, O-rings, washer, other sealing mechanisms, or a combination thereof.

Turning now to the figures, FIG. 1 illustrates a perspective view of a brake system 20 in accordance with the present teachings. The brake system 20 may include a parking brake system incorporated therein. The brake system 20 may be adapted to complete a braking operation on a vehicle. Such a braking operation may be a brake apply during use of the vehicle to slow a vehicle down during movement. Similarly, the brake system 20 may also complete a park apply operation when a vehicle is in a stationary position by implementing the park brake system therein. As such, the park brake system may be incorporated into the brake system 20 using common components of the brake system 20 or may include a separate assembly for the park brake system therein.

As shown, the brake system 20 may include a caliper housing 22 adapted to at least partially surround a rotor of a vehicle (not shown). As a result, the caliper housing 22 may position a brake pad 24 of the brake system 20 adjacent to the rotor so that, during a braking operation of the vehicle, the brake pad 24 may be moved towards the rotor to contact the rotor, thereby slowing the vehicle.

The brake pad 24 may be secured to a pressure plate 26. The pressure plate 26 may be in communication with a piston 30 at least partially housed within a piston housing 28 of the caliper housing 22. The piston housing 28 may be integrally (i.e., monolithically) formed with the caliper housing 22 or may be separate from the caliper housing 22 and secured to the caliper housing 22. The piston 30 may be driven by a linear actuator, such as a spindle and nut assembly (not shown) also located at least partially within the piston housing 28, so that the piston 30 extends out from the piston housing 28 to contact the pressure plate 26, thereby moving the brake pad 24 into contact with the vehicle rotor.

Figure 2:
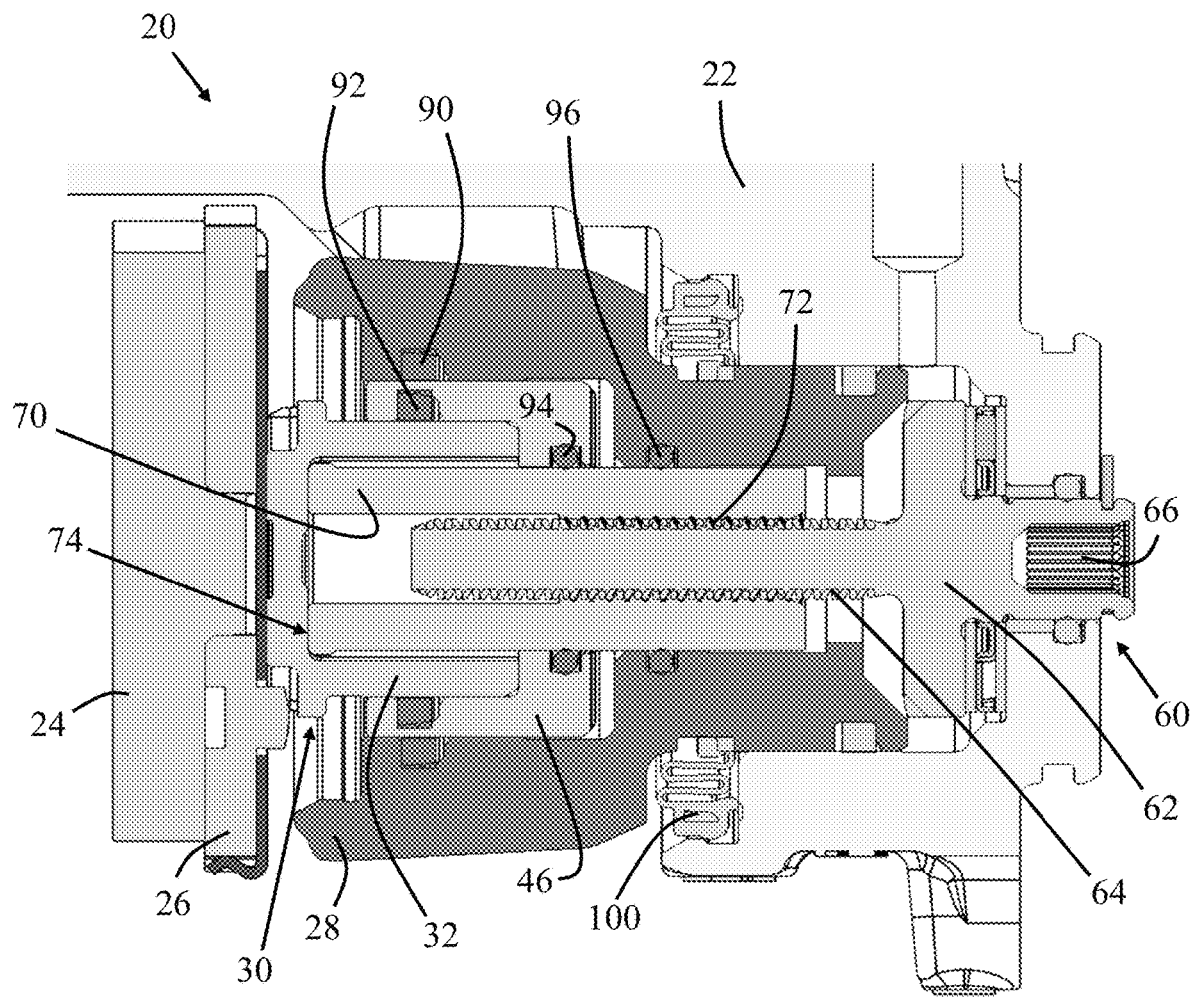
FIG. 2 is a cross-section of a brake system in accordance with the present teachings.

FIG. 2 illustrates a cross-sectional view of a brake system 20 in accordance with the present teachings. As described above, the brake system 20 may include a caliper housing 22 at least partially surrounding a rotor of a vehicle so that a brake pad 24 secured to a pressure plate 26 may be moved by a piston 30 of the brake system 20 to contact the rotor of the vehicle (i.e., a brake apply operation).

The piston 30 may be located at least partially within a piston housing 28 of the brake system. The piston housing 28 may include an opening to allow for the piston 30 to articulate within the piston housing 28 to contact the pressure plate 26. Additionally, as noted above, the piston housing 28 may be formed with the caliper housing 22 or may be secured to or within a portion of the caliper housing 22. For example, as shown in FIG. 2, the piston housing 28 may be secured within a portion of the caliper housing 22 so that a gap between the piston housing 28 and the caliper housing 22 may be at least partially sealed by a boot 100 of the brake system 20.

The piston 30 located within the piston housing 28 may be a two-piece piston 30. That is, the piston 30 may include a piston face 32 connected to, and in communication with, a piston main 46. As a result, the piston 30 may advantageously facilitate movement of the piston face 32 relative to the piston main 46, or vice versa. Due to such movement, the piston 30 may better alleviate the brake system 30 from unwanted pressure build-up within the piston housing 28, prevent overheating of the brake system 30 during operation due to more effective venting within the piston 30, or both. As stated above, the brake system 20 may include a unitary assembly to allow for both brake apply operations (i.e., braking applications during movement of the vehicle to slow and/or stop the vehicle) and park brake apply operations (i.e., when the vehicle is stopped, the brake pad 24 may contact the rotor to maintain a position of the vehicle). As such, a common piston 30 may be used for both the brake apply operation and the park brake apply operation, whereby one or both operations may be electromechanically operated, hydraulically operated, or a combination thereof. For example, a brake apply operation may at least in part articulate the piston 30 due to hydraulic fluid located between the piston main 46 and the piston housing 28. Conversely, the park brake apply may be electromechanically operated by a spindle and nut assembly 60 that drives the piston face 32 into the pressure plate 26.

More specifically, during a brake apply operation, the hydraulic fluid may apply pressure to the piston main 46 to move the piston main 46 toward the brake pad 24. As a result, the piston face 32 at least partially seated within the piston main 46 may also move towards the brake pad 24 until the piston face 32 contacts the pressure plate 26, thereby moving the brake pad 24 into or towards the rotor of the vehicle.

During a park brake apply operation, the hydraulic fluid may not contribute to movement of the piston 30, though in some cases it may. In particular, when a park brake apply operation is activated, the spindle and nut assembly 60 may articulate by translating a rotary movement to a linear movement, thereby contacts the piston 30 to move the piston 30 towards the brake pad 24. Specifically, the spindle and nut assembly 60 may include a spindle 62 in communication with a motor (not shown) via an engaging portion 66 of the spindle 62. The motor may cause rotation of the spindle 62 so that threading 64 of the spindle 62 may mesh with threading 72 of a nut 70 secured to the spindle 62. As the spindle 62 is rotated, the nut 70 may be guided along the threading 64 of the spindle 62 in a linear direction (i.e., a direction along a longitudinal axis of the spindle 62) towards the piston face 32 until a contact surface 74 of the nut 70 contacts the piston face 32, thereby moving the piston face 32 into contact with the pressure plate 26 to move the brake pad 24 towards the rotor. When a park brake apply operation is completed, the spindle 62 may rotate in an opposing direction to linearly retract the nut 70 back towards its original position.

Additionally, while hydraulic apply of the brake system 20 has been described for brake apply operations, it is also envisioned that in certain circumstances the spindle and nut assembly 60 may also at least partially or entirely complete the brake apply operation in addition to the park brake apply operation. As such, it should be noted that the teachings herein are not limited to a specific brake system 20, but rather may be advantageously incorporated into a variety of brake system 20 structures, configurations, etc.

Furthermore, as shown in FIG. 2, the piston 30 and/or the spindle and nut assembly 60 may be sealed relative to the piston housing 28. For example, a piston main seal 90 may annularly seal a gap between the piston main 46 and the piston housing 28. Moreover, a gap between the piston main 46 and the piston face 32 may be sealed by a piston face seal 92. As a result, hydraulic fluid that may be present within a space between the piston 30 (e.g., the piston main 46) and the piston housing 28 may be preventing from entering the piston 30, leaking out of the piston housing 28, or both. Similarly, a pair of nut O-rings 94, 96 may annularly seal the nut 70 of the BNA 60 relative to the piston main 46 and the piston housing 28, respectively. As such, the hydraulic fluid present within the space between the piston main 46 and the piston housing 28 may be further prevented from leaking into the piston 30, leaking out of the piston housing 28, or both.

Figure 3:
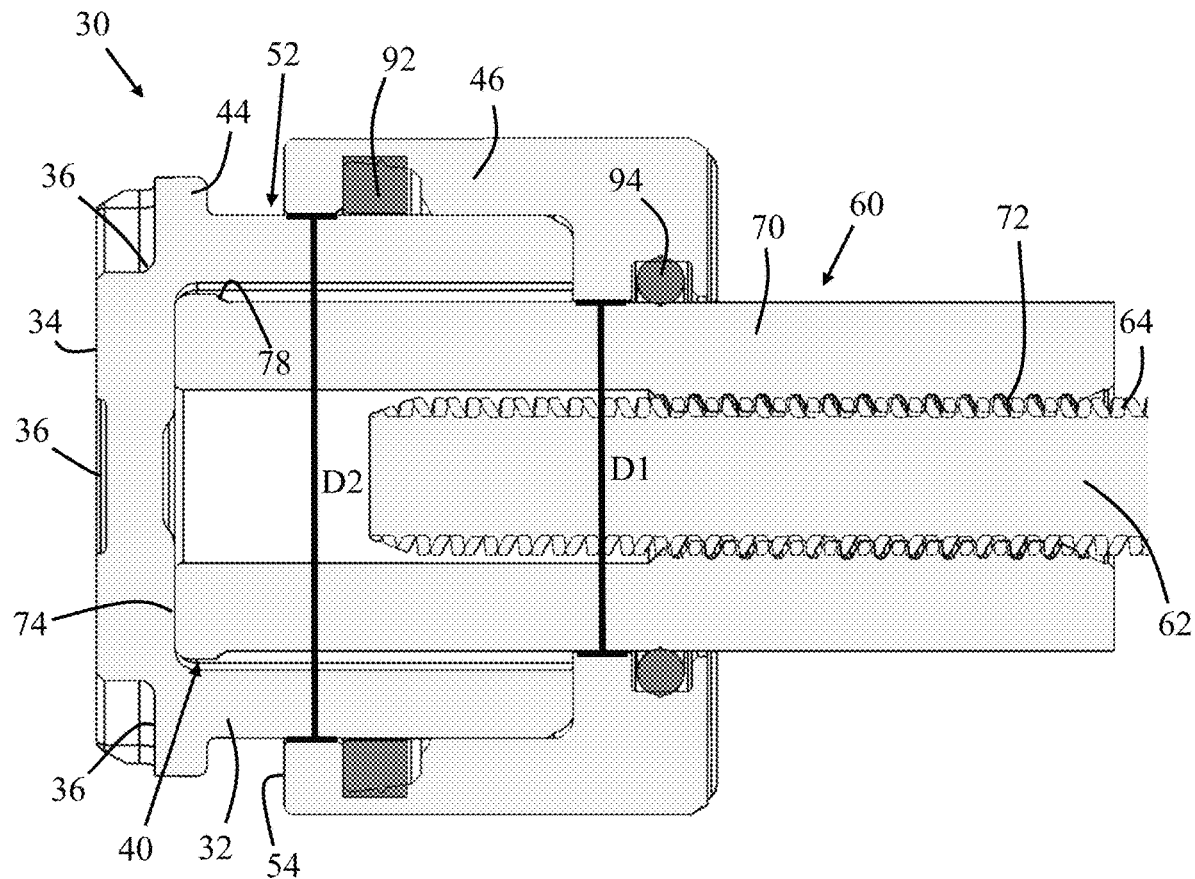
FIG. 3 is a close-up cross-section of a piston in accordance with the present teachings.

FIG. 3 illustrates a close-up cross-sectional view of a piston 30 in accordance with the present teachings. While a single-piece piston may be utilized in certain brake systems 20 with the BNA as described herein, a two-piece piston 30 may provide additional benefits, such as those mentioned above. As such, the piston 30 may include a piston face 32 at least partially seated in a channel of a piston main 46 and extending through an inboard surface 54 of the piston main 46.

The piston face 32 may be in communication with a spindle and nut assembly 60 extending at least partially through or into the piston main 46, the piston face 32, or both. The spindle and nut assembly 60 may include a spindle 62 engaged to a motor (not shown) to rotate the spindle 62 along a longitudinal axis of the spindle 62. As a result, threading 72 of a nut 70 may mesh with threading 64 the spindle 62, thereby moving the nut 70 linearly towards an inner portion of the piston face 32. As a contact surface 74 of the nut 70 pushes against the piston face 32, the piston face 32 may then move towards a brake pad of the brake system until a contact surface 34 of the piston face 32 having a plurality of grooves 36 contacts the brake pad or a component thereof, thereby moving the brake pad (see FIG. 2). It should be noted that movement of the piston face 32 may be in conjunction with the piston main 46 or the piston face 32 may move separately (e.g., away) from the piston main 46 due to the force applied by the spindle and nut assembly 60 on the piston face 32. Moreover, as stated above, a piston face seal 92 may be located to seal a gap between the piston main 46 and the piston face 32. Similarly, a first nut O-Ring 94 may be located annularly around the nut 70 to seal a gap between the nut 70 and the piston main 46.

The channel of the piston main 46 may receive at least a portion of the piston face 32, the spindle and nut assembly 60, or both. To ensure proper engagement between the piston 30 and the spindle and nut assembly 60, the channel of the piston main 46 may have one or more openings, each opening having a diameter. For example, the channel may have a first opening that receives the spindle and nut assembly 60, the first opening having a diameter D1. Additionally, the channel may have a second opening that receives the piston face 32, the second opening having a diameter D2. While the diameter D1 of the first opening may be equal to the diameter D2 of the second opening, it is envisioned that the diameters D1, D2 may be different. As shown, the diameter D2 of the second opening may be greater than the diameter D1 of the first opening. As a result, the piston face 32 may be seated into the channel through the second opening, yet beneficially be prevented from extending through the first opening due to the diameter D1 of the first opening being smaller than a diameter of the piston face 32. Therefore, the piston face 32 may maintain engagement with the piston main 46 during operation. Similarly, the nut 70 received through the first opening may include a flange 78 that has a diameter greater than the diameter D1 of the first opening. As a result, travel (i.e., extension and/or retraction) of the nut 70 caused by the spindle 62 may be completed without the nut 70 travelling entirely through the second opening, thereby disengaging the nut 70 from the piston 30. That is, the flange 78 may abut a lip of the first opening due to the diameter D1 of the first opening being smaller than a diameter of the nut 70 as measured at the flange 78.

It should also be noted that varying geometries of the piston 30 may exist based upon various brake systems 20. As shown, the piston face 32 may include a flange 44 near the contact surface 34 of the piston face 32. While FIG. 3 illustrates that, even when seated entirely in the piston main 46, the flange 44 is free of contact with the inboard surface 54 of the piston main 46. However, it is also envisioned that, in certain circumstances, the flange 44 of the piston face 32 may abut the inboard surface 54 of the piston main 46 when fully seated in the piston main 46. That is, the flange 44 of the piston face 32 may contact the inboard surface 54 of the piston main 46 as a stopping point of travel for the piston face 32 in a direction opposite of a brake apply direction (i.e., a retraction direction).

Figure 4A:
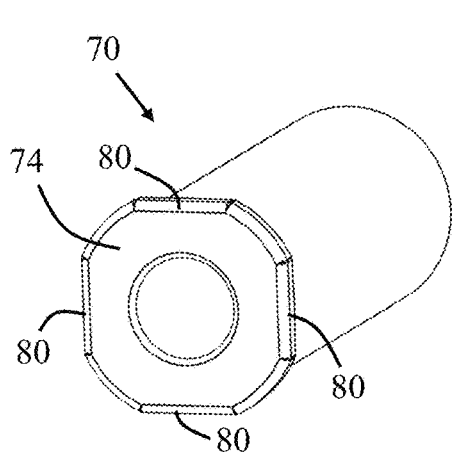
FIG. 4A is a perspective view of a nut of a spindle and nut assembly.
Figure 4B:
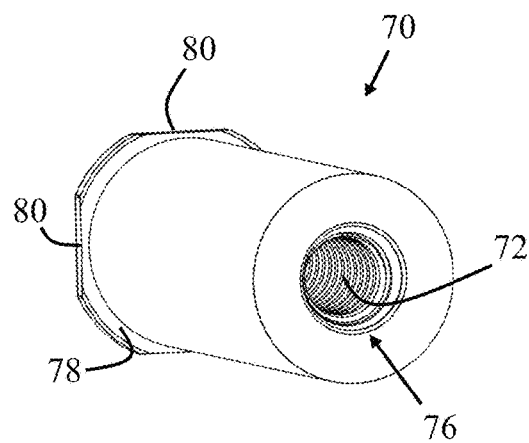
FIG. 4B is an additional of the nut shown in FIG. 4A.

FIGS. 4A and 4B illustrate perspective views of a nut 70 of a spindle and nut assembly, such as the spindle and nut assembly shown in FIGS. 2 and 3. The nut 70 may include a channel 76 therein that includes an internal threading 72. The threading 72 of the nut 70 may be adapted to engage threading of a spindle of the spindle and nut assembly (see FIGS. 2 and 3). As the nut 70 is moved by the spindle, a contact surface 74 of the nut 70 may be adapted to contact a surface of a piston face, such as an interior surface of the piston face. Additionally, the nut 70 may include a flange 78 extending from or near the contact surface 74. Advantageously, the flange 78 may be adapted to contact a portion of the piston main to prevent disengagement between the piston main and the nut 70 during operation. Additionally, the flange 78 may include one or more anti-rotation features 80 that may engage a portion of the piston face and prevent rotation of the piston face relative to the nut 70, or vice versa. As shown the anti-rotation features 80 may be one or more chamfered or flat surfaces along an otherwise annular surface. However, any geometry that may engage the piston face.

Figure 5A:
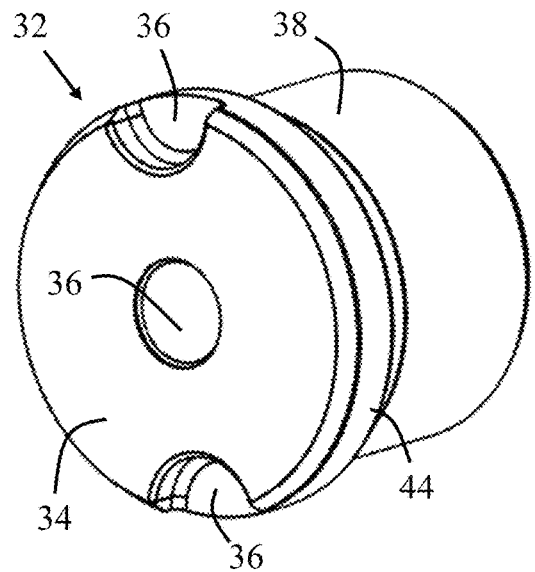
FIG. 5A is a perspective view of a piston face of the piston in accordance with the present teachings.
Figure 5B:
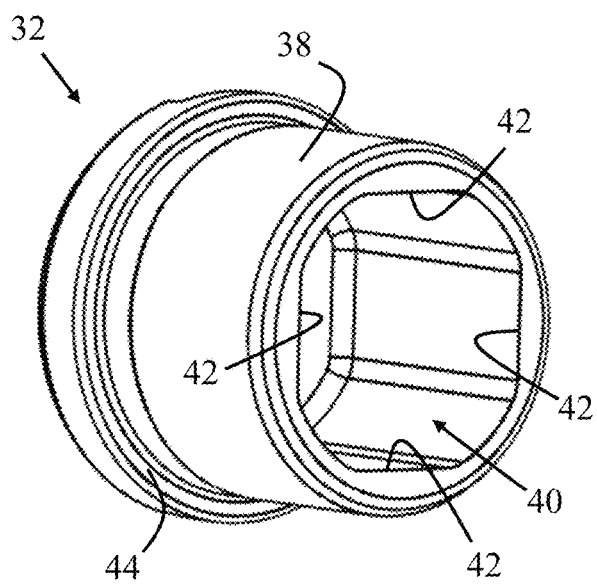
FIG. 5B is an additional perspective view of the piston face shown in FIG. 5A.

FIGS. 5A and 5B illustrate perspective views of a piston face 32 of a ball nut assembly (BNA), such as the BNA shown in FIGS. 2 and 3. The piston face 32 may include a neck 38 that may be configured for insertion into a channel of a piston main (see FIGS. 2 and 3). The piston face 32 may also include a cavity 40 adapted to receive a portion of a nut of the BNA so that the nut may press against an interior surface of the piston face 32 to move the piston face 32. As such, the BNA and the nut thereof may move the piston face 32 so that a contact surface 34 of the piston face having one or more grooves 36 contacts the brake pad or a part thereof, thereby moving the brake pad to engage a rotor of a vehicle. Moreover, the piston face 32 may include a flange 44 that extends from the neck 38 and/or the contact surface 34 of the piston face 32.

The cavity 40 of the piston face 32 may include one or more anti-rotation features 42. The anti-rotation features 42 of the cavity 40 may align with or correspond to one or more anti-rotation features of the nut (see FIGS. 2 and 3). For example, the anti-rotation features 42 of the cavity 40 may be substantially flat portions along a substantially annular surface of the cavity. The anti-rotation features 42 may thus correspond to substantially flat portions along the nut, thereby preventing rotation of the piston face 32 and the nut relative to each other.

Figure 6A:
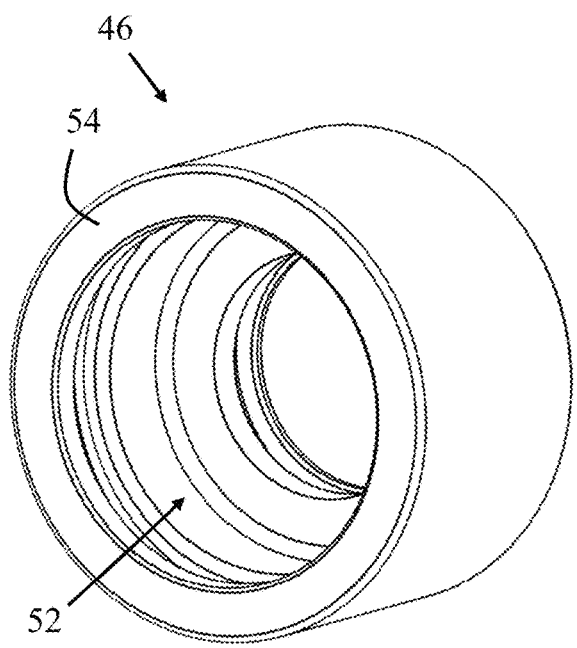
FIG. 6A is a perspective view of a piston main of the piston in accordance with the present teachings.
Figure 6B:
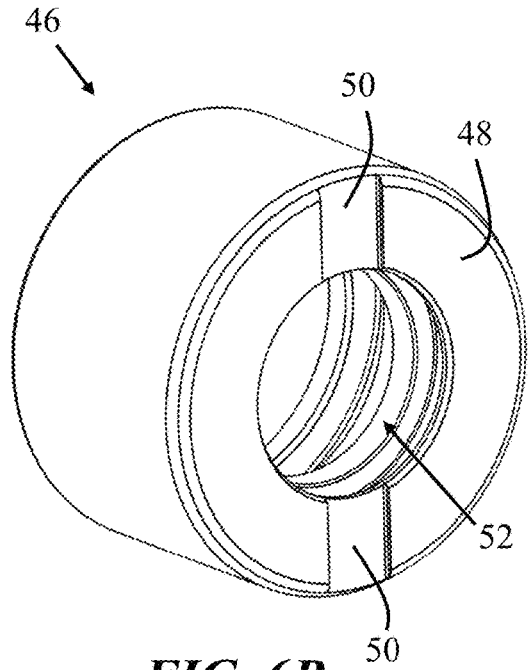
FIG. 6B is an additional perspective view of the piston main shown in FIG. 6A.

FIGS. 6A and 6B illustrate perspective views of a piston main 46 of a spindle and nut assembly, such as the spindle and nut assembly shown in FIGS. 2 and 3. The piston main 46 may include a channel 52 extending through a length of the piston main 46. The channel 52 may include one or more openings that receive at least a portion of a nut, the piston face, or both. As shown, the channel 52 may include a first opening in the base surface 48 of the piston main 46 between grooves 50 of the base surface 48. The channel 52 may also include a second opposing opening on an inboard surface 54 of the piston main 46, whereby the first opening and the second opening may vary in size (e.g., diameter). However, any sized and/or shaped openings may be utilized based upon the given application.

Figure 7:
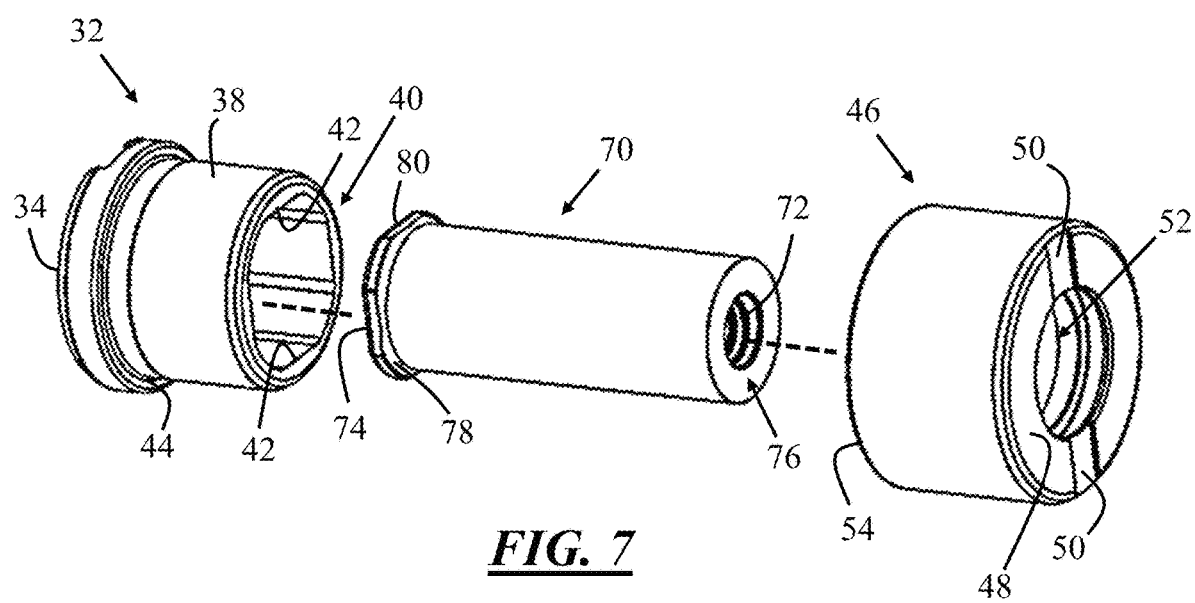
FIG. 7 is an exploded view of the piston in communication with a nut of a spindle and nut assembly in accordance with the present teachings.

FIG. 7 illustrates an exploded view of a piston face 32 and a piston main 46 in communication with a nut 70 of a spindle and nut assembly. The piston face 32 may include a cavity 40 that receives a portion of the nut 70, including a contact surface 74 of the nut. The cavity 40 may include one or more anti-rotation features 42 that align with and engage anti-rotation features 80 of the nut 70 located along a flange 78 of the nut 70, whereby the anti-rotation features 80 may form at least a partial perimeter of the contact surface 74. As a result, the nut 70 and the piston face 32 may be prevented from unwanted rotation relative to each other. Based upon such communication, the nut 70 may be adapted to contact the piston 32 along its contact surface 74 to move the piston face 32 towards a brake pad so that a contact surface 34 of the piston face 32 may engage the brake pad. Movement of the nut 70 may be articulated by a spindle of the spindle and nut assembly (not shown), whereby the spindle linearly guides the nut 70 along internal threading 72 located within a channel 76 of the nut 70.

The piston face 32 and the nut 70 may be at least partially positioned within a channel 52 of the piston main 46. The piston face 32 and the nut 70 may be inserted through an opening of the channel 52 along an inboard surface 54 of the piston main 46. The piston face 32 may be adapted to abut an interior surface of the piston main 46 while the nut 70 may be adapted to extend through an opposing opening of the piston main 46 located along a base surface 48 of the piston main 46. The base surface 48 may also include one or more grooves 50 therein.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference in their entireties for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

20 Brake System
22 Caliper Housing
24 Brake Pad
26 Pressure Plate
28 Piston Housing
30 Piston
32 Piston Face
34 Contact Surface of the Piston Face
36 Groove of the Contact Surface
38 Neck of the Piston Face
40 Cavity of the Piston Face
42 Anti-Rotation Feature of the Piston Face
44 Flange of the Piston Face
46 Piston Main
48 Base Surface of the Piston Main
50 Groove of the Base Surface
52 Channel of the Piston Main
54 Abutting Surface of the Piston Main
60 Spindle and Nut Assembly
62 Spindle
64 Threading of the Spindle
66 Engaging Portion of the Spindle
70 Nut
72 Threading of the Nut
74 Contact Surface of the Nut
76 Channel of the Nut
78 Flange of the Nut
80 Anti-Rotation Feature of the Nut
90 Piston Main Seal
92 Piston Face Seal
94 First Nut O-Ring
96 Second Nut O-Ring
100 Piston Boot
D1 Diameter of a First Opening in the Piston Main
D2 Diameter of a Second Opening in the Piston Main

What is claimed is:

1. A brake system comprising:
   (a) a caliper housing connected to or formed with a piston housing;
   (b) a piston having a piston face seated in a piston main, wherein the piston is at least partially secured within the piston housing; and
   (c) a spindle and nut assembly adapted to move the piston face relative to the piston main to engage a brake pad of the brake system;
      wherein during a brake apply operation, the piston main is moved by hydraulic fluid located within the piston housing between the piston housing and the piston main, whereby the piston main moves the piston face so that the piston face engages the brake pad.

2. The brake system of claim 1, wherein the spindle and nut assembly includes a nut threadably engaged to a spindle so that rotational movement of the spindle is translated into linear movement of the nut.

3. The brake system of claim 2, wherein a contact surface of the nut contacts an interior surface of the piston face to move the piston face.

4. The brake system of claim 3, wherein the nut includes an anti-rotation feature that engages an anti-rotation feature of the piston face.

5. The brake system of claim 4, wherein the anti-rotation feature of the piston face is located within a cavity of the piston face, and the anti-rotation feature of the nut is inserted into the cavity to engage the anti-rotation feature of the piston face.

6. The brake system of claim 5, wherein the anti-rotation feature of the piston face is a substantially flat portion along an annular surface of the cavity.

7. The brake system of claim 6, wherein the anti-rotation feature of the nut is a substantially flat portion located along the nut.

8. The brake system of claim 2, wherein the piston main includes a channel having a first opening and an opposing second opening.

9. The brake system of claim 8, wherein a diameter of the first opening is less than a diameter of the second opening.

10. The brake system of claim 8, wherein the nut and the piston face are inserted through the opposing second opening, and the nut extends at least partially through the first opening after insertion.

11. The brake system of claim 10, wherein the nut includes a flange having a diameter greater than a diameter of the first opening.

12. The brake system of claim 2, wherein the nut includes an internal threading that engages an external threading of the spindle.

13. The brake system of claim 1, wherein a seal is located between the piston main and the spindle and nut assembly to prevent leaking of the hydraulic fluid.

14. The brake system of claim 13, wherein a seal is located between the spindle and nut assembly and the piston housing to prevent leaking of the hydraulic fluid.

15. The brake system of claim 13, wherein a second seal is located between the piston main and the piston face to prevent leaking of the hydraulic fluid.

16. The brake system of claim 1, wherein the spindle and nut assembly moves the piston face to engage the brake pad during a parking brake apply operation.

17. The brake system of claim 1, wherein the spindle and nut assembly remains stationary during the brake apply operation.

18. The brake system of claim 1, wherein the piston main remains stationary when the spindle and nut assembly moves the piston face.

19. The brake system of claim 1, wherein the hydraulic fluid is free of contact with the piston face.

* * * * *